Sept. 12, 1944.  C. G. STRANDLUND  2,358,261
CLUTCH MECHANISM
Filed June 17, 1940  3 Sheets-Sheet 1
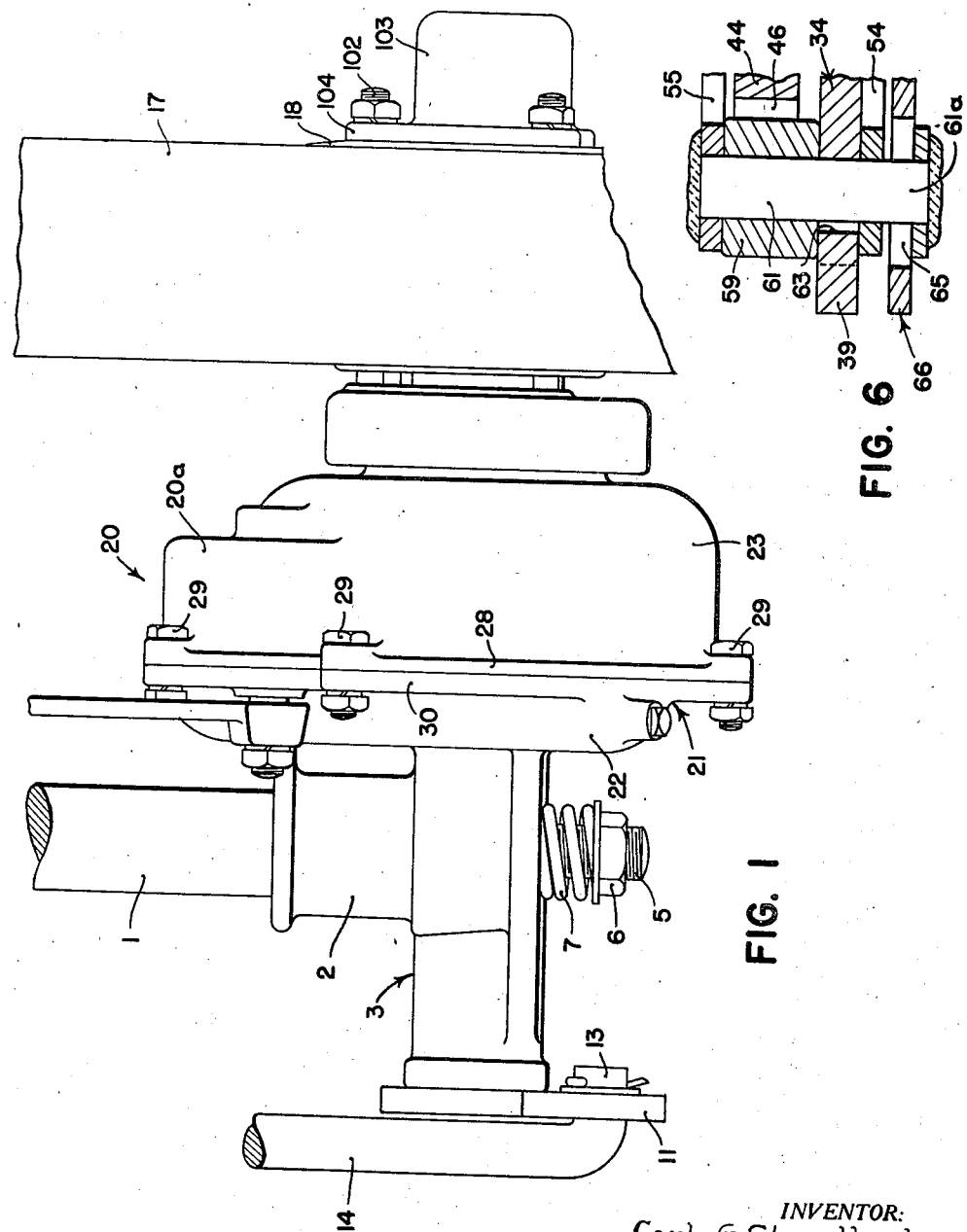
INVENTOR:
Carl G. Strandlund
BY
ATTORNEYS.

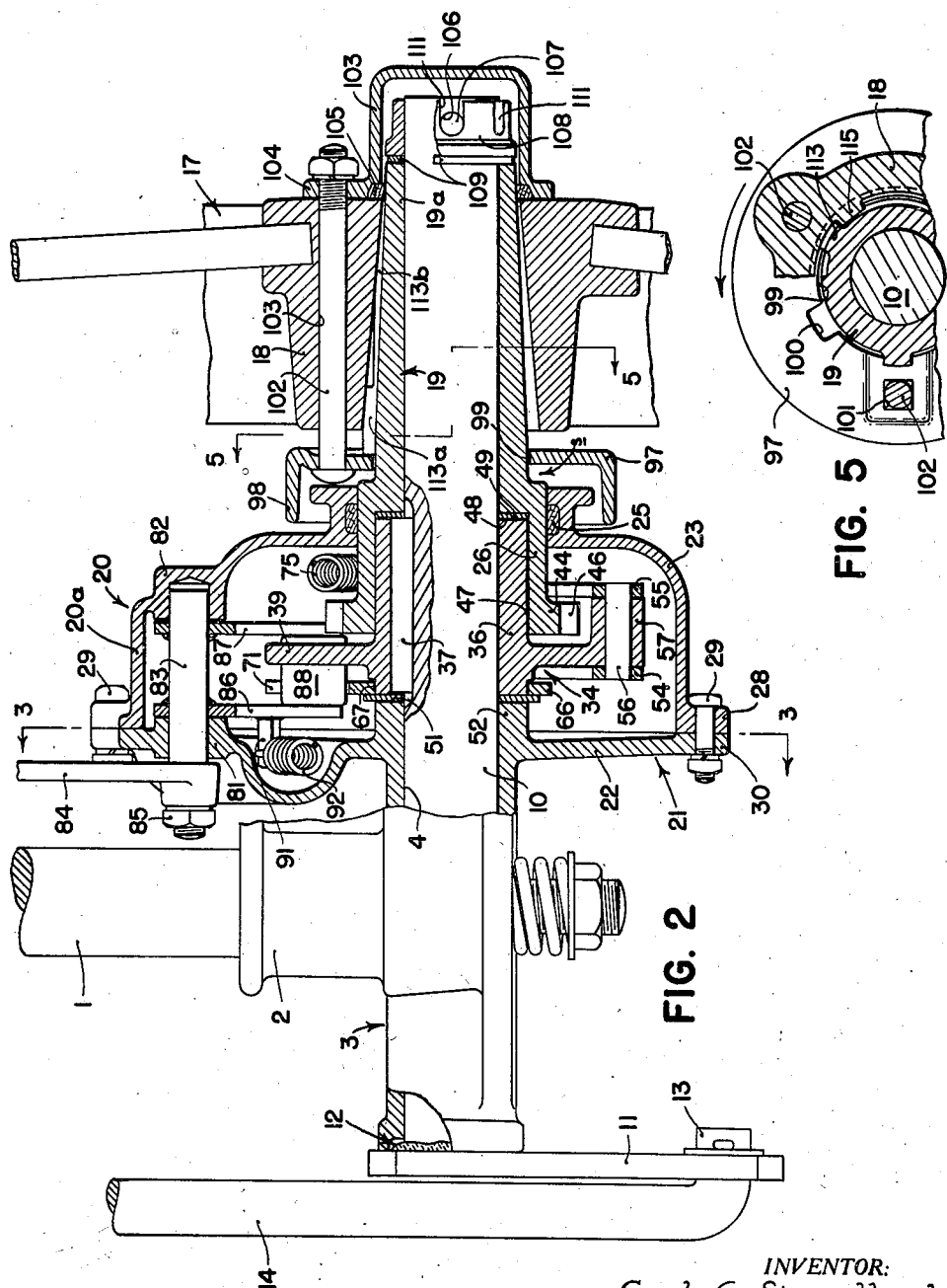

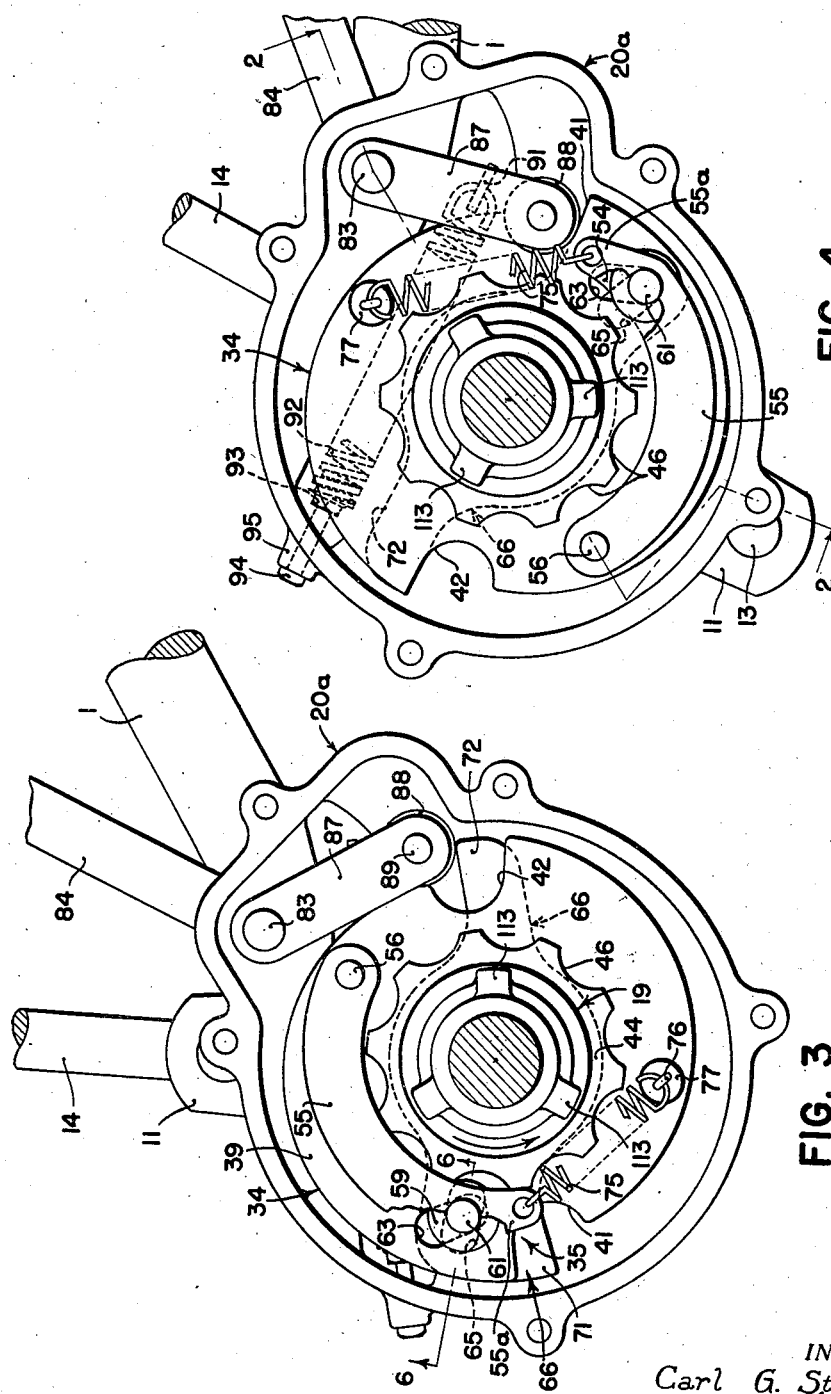

Patented Sept. 12, 1944

2,358,261

UNITED STATES PATENT OFFICE 2,358,261

CLUTCH MECHANISM

Carl G. Strandlund, Moline, Ill., assignor to Deere & Company, Moline, Ill., a corporation of Illinois Application June 17, 1940, Serial No. 340,925

14 Claims. (Cl. 192—62)

The present invention relates generally to agricultural implements and more particularly to power lift clutches by which a constantly rotatable part is operatively connected with an intermittently driven part for effecting some adjustment of the implement, such as raising or lowering the tool or tools into and out of the ground. Clutch mechanism of this general type is disclosed in my prior Patents Nos. 2,119,757 and 2,156,362, issued June 7, 1938, and May 2, 1939, respectively.

The object and general nature of this invention is the provision of a self-interrupting clutch for agricultural uses which has its operating parts, or at least the major portions thereof, enclosed in a lubricant tight casing or housing, which not only keeps the operating parts adequately lubricated but completely seals such parts from dirt, dust and the like, thereby providing a smoother operating and longer lived clutch mechanism. A clutch mechanism of this type is particularly adapted for use in territories which are dusty and where the soil is of an abrasive nature.

A further feature of this invention is the provision of clutch mechanism that is especially compact and hence requires little space on the implement. As a result, there is adequate clearance between the clutch mechanism and the ground and all associated operating parts. It will be recognized that this is an important feature, especially where the clutch mechanism itself is to be enclosed. Certain prior clutch mechanisms with which I am familiar are fairly bulky, due at least in part to the fact that the connecting means between the driving and driven members extends generally radially from one to the other. Since each of the driving and driven members must be large enough to have adequate strength to sustain all the forces to which it is subjected, it will be seen that if clutch mechanism of this character, where the connecting part extends generally radially from one member to the other, is provided with an enclosing casing it would have to be quite large and might require more space on the implement, in order to obtain the necessary clearance between the ground and associated operating parts, than could be provided in a practical commercial machine. According to the present invention, the connecting means between the driving and driven parts of the clutch is arranged, not to extend radially outwardly but, rather, in close overlapping relation so that the radial dimension of the clutch is small and can, as a practical proposition, be enclosed in a casing that is quite small and does not reduce the clearance to any objectionable extent.

Another important feature of the present invention resides in the provision of a clutch of the self-interrupting type in which a driving part is connected with a driven part through a roller supporting strap in which the latter transmits the driving force in tension, rather than in compression, or a pushing strain, as in former clutches. This particular feature materially contributes to the compactness of my novel clutch mechanism. Also, in this connection it is a further feature of this invention to provide the driving member with external notches or scallops, whereby this member, which is usually a casting, is stressed in compression, rather than in tension as in former clutches in which the driving member was provided with internal scallops, and normally subjected to expansive forces which the member was required to resist in tension. As will be understood, cast metal is not particularly strong in tension but is capable of withstanding relatively high compressive stresses.

Still further, another feature of this invention is the provision of new and improved means for securing the driving ground wheel to the driving member of the clutch, which does not weaken any of the clutch parts.

These and other objects and advantages of the present invention will be apparent to those skilled in the art after a consideration of the following detailed description, taken in conjunction with the accompanying drawings illustrating the preferred form in which the principles of the present invention have been incorporated.

In the drawings:

Figure 1 is an elevational view of a power lift clutch mechanism adapted for use on a tractor plow having a swinging crank axle, movement of which serves to raise and lower the plow bottoms;

Figure 2 is a view similar to Figure 1, but with certain parts broken away along the section line 2—2 of Figure 4, in order to show the internal construction and arrangement of the clutch mechanism;

Figures 3 and 4 are side views, with the driving ground wheel and one part of the casing removed, showing the operation of the clutch mechanism and controlling means therefor;

Figure 5 is a view taken generally along the line 5—5 of Figure 2, showing the manner of mounting the ground wheel in driving engagement on the driving member of the clutch; and Figure 6 is a section taken along the line 6—6 of Figure 3, showing the clutch engaging roller and associated parts.

Referring now to the drawings, more particularly to Figures 1 and 2, the reference numeral 1 indicates the swinging crank axle of a tractor plow, such as one of the type shown in my prior patents mentioned above. The crank axle 1 extends downwardly and forwardly, and at its lower end is received in the socket portion 2 of a rear axle sleeve 3, the latter having a transverse shaft receiving bore 4 therein. The forwardmost end of the crank axle 1 is threaded, as at 5, and receives a nut 6 and a spring 7 by which the sleeve 3 is fixed to the crank axle 1 so as to form, in effect, a part thereof. Journaled for rotation in the bore 4 of the sleeve 3 is a transverse land wheel axle 10 carrying a crank 11 at its inner end, suitably secured thereto as by welding 12, and the outer end of the crank 11 is apertured to receive the lower outturned end 13 of a link 14 which extends generally upwardly and is pivoted to a depth adjusting lever on the plow, as in conventional construction. The opposite or outer end of the axle 10 receives a land wheel 17 having a hub 18 by which the wheel 17 is fixed to the driving member 19 of a power lift clutch mechanism indicated in its entirety by the reference numeral 20. The manner in which the wheel 17 is secured in place on the driving member 19 of the clutch 20 will be described below.

The clutch 20 is of novel construction. Disposed about the stub shaft 10 between the crank axle 1 and the wheel 17 is a clutch casing indicated in its entirety by the reference numeral 21, and comprising two casing parts 22 and 23. The former preferably is formed integrally with the sleeve 3, but of course it may be formed separately and suitably secured thereto in any suitable manner, if desired. The casing part 23 is in the form of a bell housing and carries suitable sealing means 25 which engages the hub portion 26 of the driving clutch member 19. The part 23 also includes a flange 28 which is bolted, as at 29, to the peripheral section 30 of the other casing part 22. The bolts 29 are pulled up tight so as to prevent leakage of lubricant at the joint between the two casing parts 22 and 23. The sleeve 3 and the casing 22, as best shown in Figure 2, have a long bearing surface on the stub shaft or land wheel axle 10 so that no sealing means at this point is necessary. The length of the sleeve section 3 is such that the normal flow of lubricant from the casing 20 laterally along the sleeve 3 provides for adequate lubrication of the axle 10 at this point, yet there is little leakage at the end of the sleeve 3 adjacent the crank arm 11 due to the fact that the axle 10 does not rotate continuously but only relatively infrequently and then not a complete revolution at any one time.

The clutch mechanism is completely enclosed within the casing 21, except that the shaft 10 as the driven part of the clutch and the member 19 as the driving part extend laterally outwardly of the clutch casing 21 from opposite sides thereof. The clutch mechanism, as best shown in Figures 2, 3 and 4, comprises the driving clutch member 19 mentioned above, the driven clutch member 34 and self-interrupting mechanism 35 (Figure 3) for optionally connecting the members 19 and 34 together. The member 34 includes a hub 36 secured to the land wheel axle 10 by any suitable means, such as a key 37, so as to form a part of the member 10. The member 34 also includes a generally radially extending flange section 39 which is formed with a pair of diametrically opposed notches 41 and 42. The driving member 19 includes the hub section 26 mentioned above, and the latter is provided with a flange 44 which is provided with notches or scallops 46 facing generally radially outwardly, as best shown in Figures 3 and 4. The hub portion 26 is provided with an enlarged bore 47 which receives and is journaled for rotation on the hub 36 of the driven member 34. The member 19 is formed with a shoulder 48 which is disposed so as to bear against the outer end of the hub 36, there being a thrust washer 49 serving as a bearing between these parts. A similar thrust washer 51 is disposed between the laterally inner end of the hub section 36 and the outer end of a flange 52 which forms a part of the sleeve 3 and the casing part 22.

A pair of roller supporting straps 54 and 55 are pivoted by means of a pin 56 to an apertured boss 57 formed on or carried by the member 34. The supporting straps 54 and 55 are generally arcuate, as best shown in Figures 3 and 4, and at their opposite ends carry a case hardened roller 59 mounted for rotation on a pin 61 that is welded at its opposite ends to the supporting straps 54 and 55. The straps 54 and 55 and the roller 59, with cooperating parts, constitute a clutch dog or clutch pawl for optionally connecting the driving and driven members 19 and 34. As best shown in Figure 6, the roller 59 does not extend all the way from one supporting strap to the other but, instead, has one end disposed closely adjacent the flange section 39 of the member 34. However, the pin 61 extends through a slot 63 formed in the flange 39 at an angle to a radius, as best shown in Figures 3 and 6. Also, the pin 61 extends entirely through the strap 54 that is disposed on the side of the member 34 opposite the roller 59 and the strap 55. The extended end of the pin 61 is indicated by the reference numeral 61a and is received in a generally radially extending slot 65 formed in a latch plate or dog 66 which is mounted for rocking movement on a reduced portion 67 (Figure 2) of the hub 36 of the member 34. Thus, the latch dog 66 is mounted for movement about the same axis about which the driving and driven members 19 and 34 are movable. As best shown in Figures 3 and 4, the pivoted latch dog 66 is provided with two arms 71 and 72 disposed adjacent the notches 41 and 42 formed in the flange 39 of the member 34, the radial slot 65 being formed in the arm portion 71 of the latch dog 66, as shown in Figure 6. Due to the relation between the slots 63 and 65, the former being disposed at an angle to the length of the slot 65, which is disposed generally radially, whenever the member 66 is rocked in one direction or the other relative to the member 34, the roller supporting straps 54 and 55 and the roller 39 carried thereby is swung toward or away from the scallops or notches 46 formed in the external peripheral portion of the clutch driving member 19. From Figures 3 and 4, it will be seen that the slot 63 in the member 34 is disposed generally radially about the pivot 56 by which the roller supporting straps 54 and 55 are connected to the driven member 34. One of the straps, as the strap 55, is extended, as at 55a (Figures 3 and 4), and is apertured to receive one end of a spring 75, the other end of which is anchored, as by a pin 76 to a lug 77 that is formed on the driven clutch member 34. The spring 75 therefore normally biases the roller supporting member 54, 55 for movement in a direction to carry the roller 59 into engagement with any one of the notches or scallops 46, and when the roller 59 is disposed in one of the notches 46, the arms 71 and 72 of the latch dog 66 occupy positions overlying, at least partly, the associated notches 41 and 42 in the member 34.

The casing 20 is extended, as at 20a (Figures 3 and 4), and is provided with apertured bosses 81 and 82 (Figure 2), in which a pin 83 is mounted for rocking movement. A trip lever 84 is fixed in any suitable way, as by a nut 85, to the outer end of the pin 83, and to the latter inside the casing 20 a pair of arms 86 and 87 are fixed, as by welding or the like. The arms 86 and 87 are disposed in spaced apart relation and at their outer ends support a roller 88 mounted on a pin 89 which is carried by the outer ends of the arms 86 and 87. The arm 86 carries a lug 91 (Figure 4) to which one end of a spring 92 is connected, the other end of the spring being connected to a nut member 93 into which is threaded an adjusting bolt 94. The casing 30 is provided with a boss 95 receiving the adjusting bolt 94. As best shown in Figure 4, the spring 92 is arranged so as to urge the trip roller 88 into a position in one or the other of the notches 41 and 42, the roller 88 at other times bearing against the peripheral surface or edge of the driven clutch member 34.

From Figure 2 it will be noted that the relatively long bearing which the sleeve 3 has on the axle 10 serves to hold the latter against displacement and that the axle 10 therefore serves to support the clutch and other parts, including the driving clutch member 19 which is mounted for rotation about the axle 10 and on the hub section 36 of the driven clutch member 34. The land wheel 17 is mounted on the laterally outwardly extended portion of the member 19 and the manner of connecting the wheel 17 to the member 19 will now be described.

The laterally outwardly extended portion of the member 19 is indicated by the reference numeral 19a in Figures 2 and 5, and this extended section is provided with a plurality, preferably three, axially extending circumferentially spaced ribs 113, each rib being lower in its central portion, thereby providing two axially spaced wheel hub receiving sections 113a and 113b. The extended section 19a of the member 19, and the ribs 113 as well, taper generally axially outwardly, and the interior of the wheel hub 18 is of complementary formation. Further, the hub 18 of the wheel is provided with a corresponding number of radially inwardly axially extending ribs 115 which, as best shown in Figure 5, are adapted to be disposed alongside and up against the companion rib 113. These cooperating pairs of ribs therefore form driving means between the hub 18 of the wheel 17 and the associated driving member 19 of the clutch. Also, since these parts are tapered, suitable means is provided for drawing the wheel axially into clamping engagement with the driving clutch member 19. Such means will now be described.

According to the present invention, means is provided for drawing the wheel 17 into place on the member 19, but such means is arranged so that it may be applied onto the member 19 from the same end thereof that receives the wheel 17, whereby it is not necessary to dismantle the clutch or other parts when attaching or removing the land wheel 17. A ring 97 having an axially inwardly directed flange 98 serving as a dust collar surrounding the outer end of the clutch casing 20, is provided with a central opening 99 adapted to pass over the outer end of the member 19, and the opening 99 is further provided with notches 100 opening into the central opening 99 so as to receive the ribs 113 on the member 19. As best shown in Figure 2, the ribs 113 terminate short of the hub section 26 whereby there is a space s into which the ring member 97 may be moved and be free of the ribs 113 so that the ring member may then be turned angularly about the axis of the clutch, thereby interlocking, in effect, the member 97 with the member 19. The ring member 97 is also provided with a plurality of bolt holes 101 which are adapted to receive bolts 102 which extend outwardly through openings 103 in the hub 18 of the wheel 17, as best shown in Figure 2. At the outer end of the wheel 17 a cap 103 having an apertured flange 104 is disposed over the threaded outer ends of the bolts 102. Preferably, sealing means 105 is disposed adjacent the inner end of the cap 103 and engageable with the member 19 whereby any lubricant leaking laterally outwardly along the axle 10 will be confined about the outer end of the members 10 and 19. By drawing up on the bolts 102 the wheel 17 will be clamped on the tapered portions of the driving clutch member 19. Also, the bolt holes 101 in the ring member 97 and the bolt holes 103 in the hub 18 of the wheel 17 are so arranged that when the ring member 97 is engaged or interlocked with the inner ends of the ribs 113, the wheel 17 is in a position in which the ribs 115 on the inside of the hub 18 thereof are disposed against one side of the associated ribs 113 on the member 19. As will be readily understood, the parts are arranged so that the ribs or lugs 113 and 115 engage one another in the driving direction, as indicated by the arrow in Figure 5.

The thrust or wearing washers 49 and 51 are preferably hardened steel. If end play develops in the clutch parts, such play may be taken up by adjusting means at the outer end of the axle 10. An opening 106 is formed in the outer end of the axle 10 to receive a pin 107. An adjusting collar 108 is fitted over the outer end of the axle 10 and bears against the outer end of the member 19 through a wearing washer 109. The collar 108 has a plurality of stepped castellations 111 of different axial dimensions, whereby by removing the pin 107 and turning the take-up collar 108 to a different position, wear in the washers 48 and 51 may be accommodated. When the wear in these parts becomes accessive, they may, of course, be replaced.

The operation of the clutch described above is substantially as follows.

Figure 3 represents the parts as they are arranged when the plow bottoms are raised and a pull has been exerted by the operator, usually through a cable or the like, on the trip lever 84 rocking the same and the trip arms 87 in a counterclockwise direction as viewed in Figure 3. It will be remembered that the driving member 19 of the clutch normally rotates in a counterclockwise direction as viewed in Figures 3 and 4. Normally, when the clutch mechanism is inactive, the spring 92 holds the roller 88 in one of the notches 41 and 42, which forces the latch dog 66 into a position, relative to the member 34, that is shown in Figure 4 and which holds the roller 59 out of the path of movement of the scallops or notches 46 on the continuously rotating member 19. However, when the operator exerts a pull on the trip lever 84, swinging the same in a counterclockwise direction as viewed in Figures 3 and 4, the roller 88 is moved out of the notch 42 (Figure 3), which permits the spring 75 to pull the roller 59 into the path of movement of the notches 46, such movement being under the control of the latch dog 66, the arm 72 of which bears against the roller 88 during this retracting movement of the latter, as shown in Figure 3. When the roller 88 is completely disengaged from the notch 42 (Figure 3) the spring 75 pulls the roller 59 into one of the scallops or notches 46. The latter are formed so that when the roller 59 seats in one of the notches driving connection is established between the continuously rotatable member 19 and the driven member 34 of the clutch. From Figure 3, which illustrates the parts as they move into driving connection, it will be seen that the roller supporting straps 54 and 55 extend across the member 19 so that a line connecting the pivot 56 with the roller pivot 61 is disposed in chordal relation with the flange 44 in which the notches 46 are formed. The straps 54 and 55 are curved so as to clear the hub portion 26 of the member 19; otherwise such members could be straight. The members 54 and 55 thus act in tension to transmit the driving force from the member 19 to the member 34. Heretofore, in prior clutches, the parts were reversed so that the roller supporting straps were required to transmit driving forces in compression or with a pushing action. As will be obvious, such members are much stronger in tension than they are in compression since in the latter case they have to be sufficiently rigid to resist buckling. Further, the driving stresses which are transmitted from one clutch member to the other are applied to the member 19 in compression, rather than in tension, as is the case where the notches or scallops are formed as internal notches facing radially inwardly, rather than radially outwardly as in Figures 3 and 4. The driving member of clutches for agricultural implements are usually castings, which are much stronger in compression than in tension, and sometimes in prior art clutches these members failed due to the transmitted forces which tend to spread or expand the driving member, rather than compressing it as in the present construction.

The clutch of the present invention remains engaged, with the strap members 54 and 55 transmitting the driving force in tension with the member 19 stressed largely in compression, so long as the operator holds the trip lever 84 in a position with the roller 88 out of contact with the notches 41 and 42. However, in normal operation, as soon as the clutch begins to drive the parts the operator releases his hold on the trip lever cable, whereupon the spring 92 swings the trip arms 86 and 87 in a clockwise direction (Figure 3) causing the roller 88 to ride along the periphery of the member 34 until it reaches the notch 41. As soon as this occurs the spring 92 starts to move the roller 88 into the notch 41, but since the arm 71 of the latch dog 66 is held against further rotation by engagement with the roller 88, the relative movement that occurs as a result thereof between the member 66 and the driven clutch member 34 causes the slots 63 and 65 to swing the roller supporting straps 54 and 55 outwardly carrying the roller 59 out of engagement with the notch in the member 19, thereby disconnecting the clutch. The relation of the pivots 56 and 61 when the roller 59 is seated in one of the notches 46, with respect to the axis of the parts 10, 19 and 34 is such that when the member 19 is rotated in the direction of the arrow the effect is to cause the strap members 54 and 55 to swing inwardly toward the axis of the shaft 10, thereby insuring that the clutch remain engaged whenever the movement of the latch lever 66 has permitted the roller 59 to enter one of the notches 47. However, the release of the clutch is readily effected by releasing the trip lever 84, as described above.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A self-interrupting clutch comprising a rotatable driving member in the form of a casting having a flange the peripheral edge of which has a plurality of external notches, a driven member mounted coaxially of and adjacent the driving member, and a connecting member pivoted at one end to said driven member at a point adjacent the external notches of said driving member and having means at the other end movable into engagement with one of the notches on said driving member, said connecting member extending from its point of pivotal connection with said driven member generally in the direction of rotation of the latter and generally in chordal relation with respect to the notched periphery of the driven member, whereby the transmission of the drive to the driven member from the notched driving member stresses the latter in compression and said connecting member in tension.

2. A self-interrupting clutch comprising a rotatable driving member having a hub and a peripheral section provided with a plurality of generally radially outwardly facing notches, a driven member having a radially extending part and a hub, a connecting member pivoted at one end to said radially extending part of said driven member adjacent the notched periphery of said driving member and having means at its other end movable into engagement with one of the notches on said driving member, said connecting member, when said means lies in one of said notches, lying alongside and generally radially inwardly of the adjacent periphery of said driven member, said connecting member extending from its point of pivotal connection with said driven member generally in the direction of rotation of the latter, whereby the transmission of the drive to the driven member from the driving member stresses the latter in compression and said connection member in tension, and an enclosing casing having sealing engagement with the hubs of said driving and driven members.

3. In an agricultural machine, the combination of driving and driven members, a clutch casing enclosing at least portions of said members, said casing including a part adapted to be passed over the outer end portion of one of said members, said one member having a portion receiving said casing part and lying in a surface that is disposed radially outwardly of the surface of said outer end portion, a wheel, and detachable means for connecting said wheel to the outer end portion of said one member at points thereon generally radially inwardly of the outer surface of the portion of said one member which receives said casing part.

4. In an agricultural machine, the combination of driving and driven members, a clutch casing enclosing said members and including a part having sealing means which is adapted to be passed over one of said members and engaged with a portion of the latter in sealing relation, wheel receiving means on said one member extending in a radial direction a distance not greater than the portion of said one member receiving said sealing means, a wheel, and means for attaching said wheel to said wheel receiving means.

5. Clutch mechanism comprising a driven member including a hub and a flange movable therewith, a driving member journaled for rotation on said driven member and also including a hub and a flange, the flanges of said members being disposed adjacent one another, the external peripheral section of one of said flanges being provided with a plurality of notches, connecting means movably mounted on the other flange adjacent the path of movement of said notches and adapted to be moved into a position to engage said notches whereby to connect said driving and driven members together with said connecting means extending across said one flange, spring means normally urging said connecting means into a position connecting said driving and driven members, a casing mounted on the hub sections of said members in lubricant tight engagement, and means on the interior of said casing for controlling the position of said connecting means.

6. Clutch mechanism comprising means serving as a casing, a constantly rotatable driving member extending into said casing means, a driven member disposed within and including a part extending out of said casing means in coaxial relation, a clutch dog within said casing pivotally connected with one member and engageable with the other member for optionally connecting said members in driving relation, means serving as a latch dog pivoted for movement about the axis of said driving and driven members, and a connection between said latch dog means and said clutch dog whereby movement of the latter is effected by movement of the latch dog means about the axis of said driving and driven members for controlling said pivoted clutch dog.

7. In an agricultural implement, a lifting clutch of the self-interrupting type adapted to raise tool means or the like into a raised position, said clutch mechanism comprising driving and driven parts mounted in coaxial relation, a clutch pawl pivotally mounted on one of said parts and engageable with the other for connecting said parts together in driving relation, a member mounted for rocking movement about the axis of said parts, said member being operatively connected with said pawl for moving the same out of engagement with said other part and said member including at least one end extending radially outwardly of said one part, and a trip lever engageable with the extended end of said rockable member for engaging the same to release said pawl from said other part and stop the rotation of said one part.

8. Clutch mechanism comprising a constantly rotatable driving member, a driven member, a clutch dog pivotally connected with one member and engageable with the other member for optionally connecting said members in driving relation, means serving as a latch dog pivoted for movement about the axis of said driving and driven members for controlling said pivoted clutch dog, said latch dog means including two outwardly extending arms, and means engageable with said arms for controlling said clutch mechanism.

9. Clutch mechanism comprising a constantly rotatable driving member, a driven member, a pair of straps pivoted to one of said members and disposed on opposite sides thereof, said one member having a slot therein arcuate with respect to the pivot of said straps, a pin extending through said slot and connected to the other ends of said straps, means on said straps engageable with the other of said driving and driven members, and a plate pivoted for movement about an axis on said one member and having a slot receiving said pin, said slot being so disposed that rocking movement of said plate swings said means into and out of engagement with said other member.

10. Clutch mechanism comprising a pair of driving and driven members, one of said members having external teeth, a pair of straps pivoted to the other of said driving and driven members, the straps being disposed on opposite sides of said other member, the latter having a slot therein arcuate with respect to the pivot of said straps, a pin extending through said slots and connected to the other ends of said straps, a roller disposed on said pin and engageable with the teeth of said one member for establishing a driving connection between driving and driven members, and a latch plate pivoted for movement about the axis of said driving and driven members and having a slot receiving said pin, said slot being so disposed that rocking movement of said plate swings said roller into and out of engagement with the external teeth on said one member.

11. Clutch mechanism comprising a constantly rotatable driving member, a driven member, a part pivoted adjacent one end to one of said members, there being a slot in said one member arcuate with respect to the pivot of said part, a pin extending through said slot and connected to the other end of said part, means on said part engageable with the other of said driving and driven members, and a second part pivoted for movement about an axis on said one member and having a slot receiving said pin, said last mentioned slot being so disposed that rocking movement of said plate swings said means into and out of engagement with said other member.

12. Clutch mechanism comprising a pair of driving and driven members, one of said members having external teeth, a part pivoted adjacent one end to the other of said driving and driven members, said other member having a slot therein arcuate with respect to the pivot of said part, a pin extending through said slot and connected to the other end of said part, a roller disposed on said pin and engageable with the teeth of said one member for establishing a driving connection between driving and driven members, and a latch plate pivoted on said driven member and having a slot receiving said pin, said slot being so disposed that rocking movement of said plate swings said roller into and out of engagement with the external teeth on said one member.

13. Self-interrupting clutch mechanism comprising flanged coaxially mounted driving and driven members, the flanges of said members being disposed adjacent one another, the external peripheral section of one of said flanges being provided with a plurality of notches, connecting means movably mounted on the other flange adjacent the path of movement of said notches and adapted to be moved into a position to engage said notches whereby to connect said driving and driven members together with said connecting means extending across said one flange, spring means normally urging said connecting means into a position connecting said driving and driven members, and means for controlling the position of said connecting means.

14. Self-interrupting clutch mechanism comprising coaxially mounted driving and driven members, a clutch dog pivotally connected with one member and engageable with the other member for optionally connecting said members in driving relation, means serving as a latch dog pivoted for movement about the axis of said driving and driven members and having opposite ends extending radially outwardly of said members, means for operating said clutch dog by movement of said latch dog means, and trip means mounted adjacent said members in a position to engage the ends of said latch dog means optionally.

CARL G. STRANDLUND.